United States Patent
Gross et al.

(10) Patent No.: US 9,152,530 B2
(45) Date of Patent: Oct. 6, 2015

(54) TELEMETRY DATA ANALYSIS USING MULTIVARIATE SEQUENTIAL PROBABILITY RATIO TEST

(75) Inventors: Kenny C. Gross, San Diego, CA (US); Ramakrishna C. Dhanekula, San Diego, CA (US); Aleksey M. Urmanov, San Diego, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 436 days.

(21) Appl. No.: 12/454,226

(22) Filed: May 14, 2009

(65) Prior Publication Data

US 2010/0292959 A1    Nov. 18, 2010

(51) Int. Cl.
| | | |
|---|---|---|
| G06F 17/18 | (2006.01) | |
| G06F 11/34 | (2006.01) | |
| G06F 11/14 | (2006.01) | |
| G06F 11/30 | (2006.01) | |
| G06F 11/07 | (2006.01) | |

(52) U.S. Cl.
CPC .......... *G06F 11/3447* (2013.01); *G06F 11/141* (2013.01); *G06F 11/3058* (2013.01); *G06F 11/3072* (2013.01); *G06F 11/0724* (2013.01); *G06F 11/0748* (2013.01); *G06F 11/0754* (2013.01)

(58) Field of Classification Search
CPC ............ G06F 11/3447; G06F 11/0724; G06F 11/0748; G06F 11/0754
USPC .......................................................... 702/181
See application file for complete search history.

(56) References Cited

U.S. PATENT DOCUMENTS

| | | | | |
|---|---|---|---|---|
| 5,987,399 | A * | 11/1999 | Wegerich et al. | 702/183 |
| 6,839,655 | B2 * | 1/2005 | Gross et al. | 702/179 |
| 7,020,802 | B2 | 3/2006 | Gross | |
| 7,171,586 | B1 * | 1/2007 | Gross et al. | 714/26 |
| 7,191,096 | B1 * | 3/2007 | Gross et al. | 702/182 |
| 7,292,952 | B1 * | 11/2007 | Gross et al. | 702/104 |
| 7,785,256 | B1 * | 8/2010 | Koh | 600/300 |
| 2004/0078723 | A1 * | 4/2004 | Gross et al. | 714/47 |
| 2006/0266708 | A1 * | 11/2006 | Yu et al. | 210/656 |
| 2007/0220298 | A1 * | 9/2007 | Gross et al. | 714/2 |
| 2008/0001777 | A1 * | 1/2008 | Gross et al. | 340/870.01 |

OTHER PUBLICATIONS

Wu et al., "Interplay of voltage and temperature acceleration of oxide breakdown for ultra-thin gate oxides," Solid-State Electronics 46 (2002) 1787-1798.*

* cited by examiner

*Primary Examiner* — Hyun Park
(74) *Attorney, Agent, or Firm* — Park, Vaughan, Fleming & Dowler LLP; Chia-Hsin Suen (57) ABSTRACT

One embodiment provides a system that analyzes telemetry data from a monitored system. During operation, the system periodically obtains the telemetry data as a set of telemetry variables from the monitored system and updates a multidimensional real-time distribution of the telemetry data using the obtained telemetry variables. Next, the system analyzes a statistical deviation of the multidimensional real-time distribution from a multidimensional reference distribution for the monitored system using a multivariate sequential probability ratio test (SPRT) and assesses the integrity of the monitored system based on the statistical deviation of the multidimensional real-time distribution. If the assessed integrity falls below a threshold, the system determines a fault in the monitored system corresponding to a source of the statistical deviation.

19 Claims, 6 Drawing Sheets

TELEMETRY DATA ANALYSIS USING MULTIVARIATE SEQUENTIAL PROBABILITY RATIO TEST

BACKGROUND

1. Field

The present embodiments relate to techniques for analyzing telemetry data. More specifically, the present embodiments relate to a method and system for analyzing telemetry data using a multivariate sequential probability ratio test.

2. Related Art

As electronic commerce becomes more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is important to ensure high availability in such enterprise computing systems.

To achieve high availability, it is necessary to be able to capture unambiguous diagnostic information that can quickly locate faults in hardware or software. If systems perform too little event monitoring, when a problem crops up at a customer site, service engineers may be unable to quickly identify the source of the problem. This can lead to increased down time.

Fortunately, high-end computer servers are now equipped with a large number of sensors that measure physical performance parameters such as temperature, voltage, current, vibration, and acoustics. Software-based monitoring mechanisms also monitor software-related telemetry parameters, such as processor load, memory and cache usage, system throughput, queue lengths, I/O traffic, and quality of service. Typically, special software analyzes the collected telemetry data and issues alerts when there is an anomaly. In addition, it is important to archive historical telemetry data to allow long-term monitoring and to facilitate detection of slow system degradation.

A threshold-based monitoring system may commonly be used to detect anomalies in the telemetry data by determining whether each telemetry parameter is operating within a specified range. If the value of a telemetry parameter goes out of range, the threshold-based monitoring system generates an alert. However, threshold-based monitoring systems are typically associated with a number of drawbacks. In particular, the accuracy of a threshold-based monitoring system may depend heavily on the accuracy of the sensors used to measure system parameters. If a sensor is imperfect and returns noisy signals, the sensor may cause the threshold-monitoring system to malfunction. Moreover, process variations during the sensor manufacturing process may cause measurement differences between different sensors. These measurement differences can also cause the threshold-monitoring system to malfunction.

Such drawbacks may partially be overcome by setting wide thresholds, which reduce the incidence of false alarms in threshold-based monitoring systems. Unfortunately, wide thresholds may delay the detection of failure conditions until degradation has reached an advanced stage. Late detection of degradation may further preclude the use of preventive maintenance and lead to forcibly shutting down the computer system for maintenance purposes, resulting in loss of productivity and business.

Hence, what is needed is a technique for early detection of degradation in monitored computer systems.

SUMMARY

One embodiment provides a system that analyzes telemetry data from a monitored system. During operation, the system periodically obtains the telemetry data as a set of telemetry variables from the monitored system and updates a multidimensional real-time distribution of the telemetry data using the obtained telemetry variables. Next, the system analyzes a statistical deviation of the multidimensional real-time distribution from a multidimensional reference distribution for the monitored system using a multivariate sequential probability ratio test (SPRT) and assesses the integrity of the monitored system based on the statistical deviation of the multidimensional real-time distribution. If the assessed integrity falls below a threshold, the system determines a fault in the monitored system corresponding to a source of the statistical deviation.

In some embodiments, assessing the integrity of the monitored system involves verifying the integrity of the monitored system if the statistical deviation is not found, and identifying a degradation risk associated with the monitored system if the statistical deviation is found.

In some embodiments, determining the fault in the monitored system involves generating a replacement signal to maintain normal operation in the monitored system.

In some embodiments, the multidimensional reference distribution is created from historical telemetry data associated with the monitored system.

In some embodiments, the monitored system corresponds to a computer system.

In some embodiments, the telemetry data for the computer system includes at least one of a load metric, a CPU utilization, an idle time, a memory utilization, a disk activity, a transaction latency, a temperature, a voltage, a fan speed and a current.

In some embodiments, the statistical deviation is analyzed based on a false-alarm probability and a missed-alarm probability for the monitored system.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
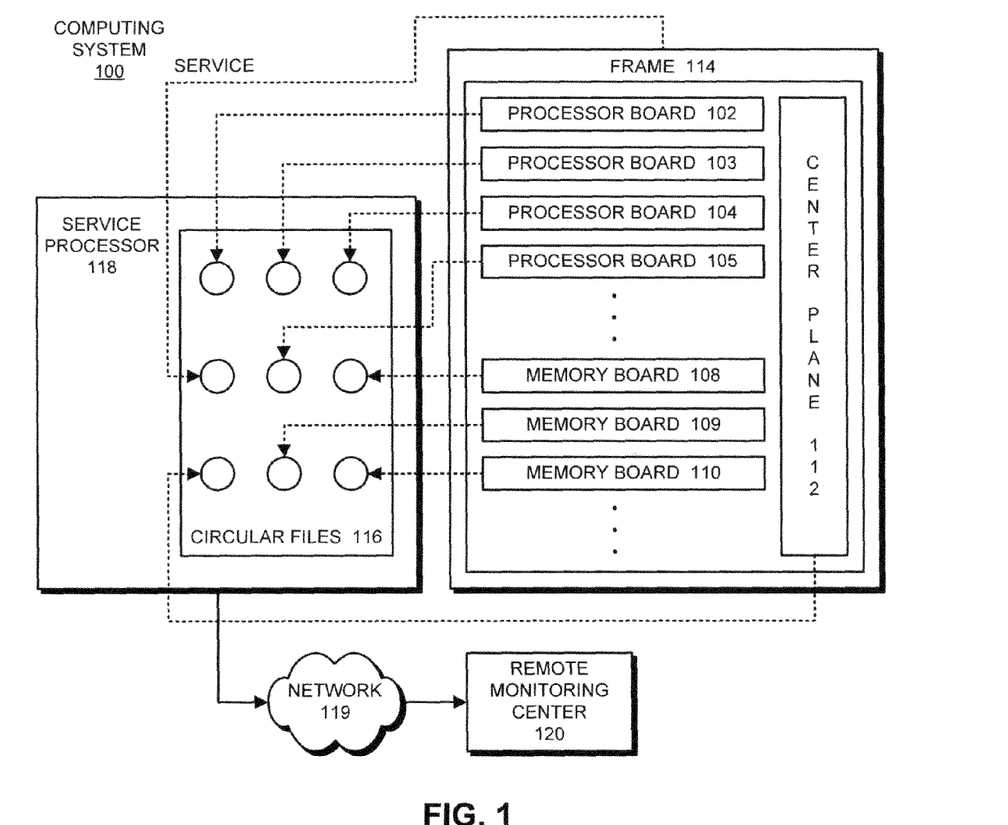
FIG. 1 shows a computer system which includes a service processor for processing telemetry signals in accordance with an embodiment.

FIG. 1 shows a computer system which includes a service processor for processing telemetry signals in accordance with an embodiment. As is illustrated in FIG. 1, computer system 100 includes a number of processor boards 102-105 and a number of memory boards 108-110, which communicate with each other through center plane 112. These system components are all housed within a frame 114.

In one or more embodiments, these system components and frame 114 are all "field-replaceable units" (FRUs), which are independently monitored as is described below. Note that all major system units, including both hardware and software, can be decomposed into FRUs. For example, a software FRU can include an operating system, a middleware component, a database, or an application.

Computer system 100 is associated with a service processor 118, which can be located within computer system 100, or alternatively can be located in a standalone unit separate from computer system 100. For example, service processor 118 may correspond to a portable computing device, such as a mobile phone, laptop computer, personal digital assistant (PDA), and/or portable media player. Service processor 118 may include a monitoring mechanism that performs a number of diagnostic functions for computer system 100. One of these diagnostic functions involves recording performance parameters from the various FRUs within computer system 100 into a set of circular files 116 located within service processor 118. In one embodiment of the present invention, the performance parameters are recorded from telemetry signals generated from hardware sensors and software monitors within computer system 100. In one or more embodiments, a dedicated circular file is created and used for each FRU within computer system 100. Note that this circular file can have a three-stage structure as is described below with reference to FIG. 2.

The contents of one or more of these circular files 116 can be transferred across network 119 to remote monitoring center 120 for diagnostic purposes. Network 119 can generally include any type of wired or wireless communication channel capable of coupling together computing nodes. This includes, but is not limited to, a local area network (LAN), a wide area network (WAN), a wireless network, and/or a combination of networks. In one or more embodiments, network 119 includes the Internet. Upon receiving one or more circular files 116, remote monitoring center 120 may perform various diagnostic functions on computing system 100, as described below with respect to FIGS. 2-3. The system of FIG. 1 is described further in U.S. Pat. No. 7,020,802 (issued Mar. 28, 2006), by inventors Kenny C. Gross and Larry G. Votta, Jr., entitled "Method and Apparatus for Monitoring and Recording Computer System Performance Parameters," which is incorporated herein by reference.

Figure 2:
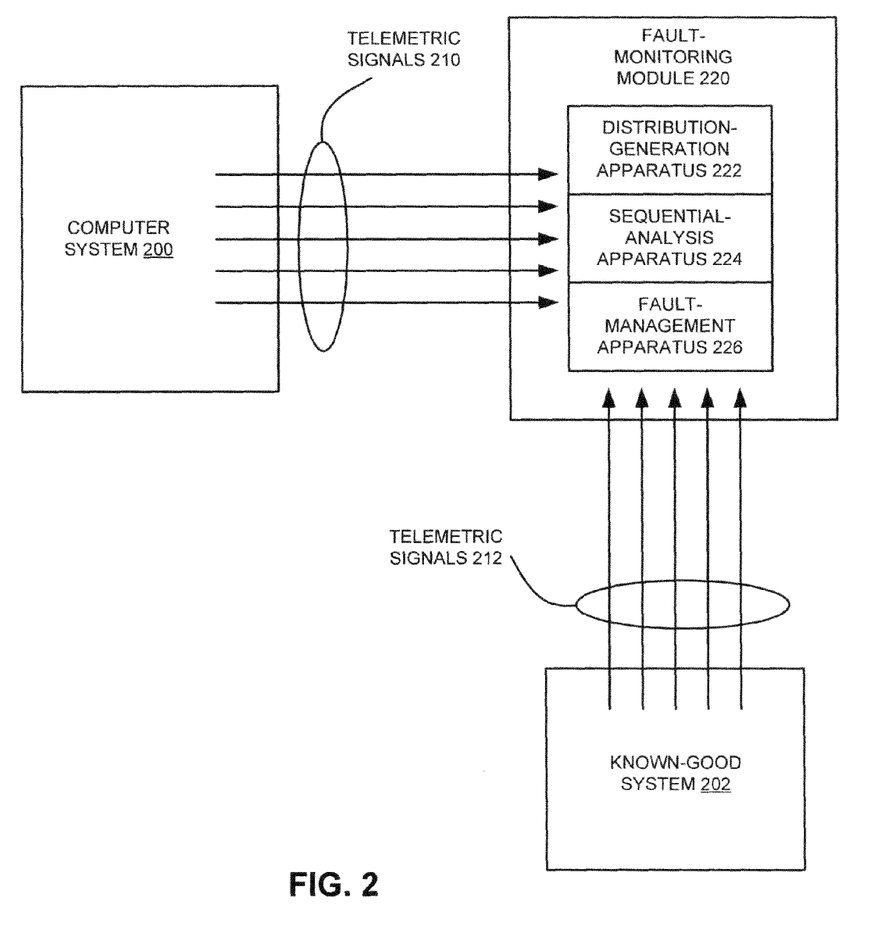
FIG. 2 shows a telemetry data archiving system which records both short-term, real-time telemetry data and long-term, historical telemetry data in accordance with an embodiment.

FIG. 2 illustrates a telemetry analysis system which examines both short-term real-time telemetry data and long-term historical telemetry data in accordance with an embodiment of the present invention. In this example, computer system 200 is monitored using a number of telemetric signals 210, which are transmitted to a fault-monitoring module 220. Fault-monitoring module 220 analyzes telemetric signals 210 and issues alerts when there is an anomaly.

Fault-monitoring module 220 may be provided by and/or implemented using a service processor associated with computer system 200. Alternatively, fault-monitoring module 220 may reside within a remote monitoring center (e.g., remote monitoring center 120 of FIG. 1) that obtains telemetric signals 210 from computer system 200 over a network connection. Moreover, fault-monitoring module 220 may include functionality to analyze both real-time telemetry signals 210 and long-term historical telemetry data. For example, fault-monitoring module 220 may be used to detect anomalies in telemetric signals 210 received directly from the monitored computer system(s). Fault-monitoring module 220 may also be used in offline detection of anomalies from the monitored computer system(s) by processing archived and/or compressed telemetry data associated with the monitored computer system(s).

As shown in FIG. 2, fault-monitoring module 220 includes a distribution-generation apparatus 222, a sequential-analysis apparatus 224, and a fault-management apparatus 226. Distribution-generation apparatus 222, sequential-analysis apparatus 224, and fault-management apparatus 226 may be used by fault-monitoring module 220 to detect statistical deviations in telemetric signals 210 and determine faults corresponding to the statistical deviations. In particular, distribution-generation apparatus 222 and sequential-analysis apparatus 224 may use a sequential-analysis technique to detect changes in the mean, variance, range of values, whiteness metric, and/or other statistical quality indicators (e.g., summary statistics) associated with telemetric signals 210. If a statistical deviation is found in telemetric signals 210, an alert is generated.

In one or more embodiments, the sequential-analysis technique used to analyze telemetric signals 210 corresponds to a sequential probability ratio test (SPRT). The SPRT may detect statistical deviations in telemetric signals 210 by comparing telemetric signals 210 with telemetric signals 212 obtained from a known-good system 202, or a computer system that is presumed to be operating correctly through extensive qualification testing. Furthermore, the statistical deviation may correspond to a drift in the distribution of pointwise differences between telemetric signals 212 from known-good system 202 and telemetry signals 210 from computer system 200, with a large enough drift indicative of degradation in computer system 200. Application of SPRT to pointwise differences in telemetric signals between two computer systems is described in U.S. Pat. No. 7,171,586 (issued Jan. 30, 2007), by inventors Kenny C. Gross, Aleksey M. Urmanov, and Kornelija Zgonc, entitled "Method and Apparatus for Identifying Mechanisms Responsible for 'No-Trouble-Found' (NTF) Events in Computer Systems," which is incorporated herein by reference.

To apply the SPRT to telemetric signals 210, sequential-analysis apparatus 224 may include a false-alarm probability and a missed-alarm probability, with an indifference region between the false-alarm probability and the missed-alarm probability. Both the false-alarm probability and missed-alarm probability may be configured based on experimental estimates conducted on historical telemetry data associated with computer system 200 and/or similar computer systems. Furthermore, one or both probabilities may be used to adjust the sensitivity of fault-monitoring module 220 to false positives or false negatives in detecting anomalous behavior from the monitored computer system(s).

The false-alarm probability used in the SPRT may correspond to the probability and/or frequency of false alarms in identifying statistical deviations in telemetric signals 210. For example, if the false-alarm probability is set to one in 1000 observations, an alert frequency of one in 1000 observations or fewer may indicate that the monitored computer system(s) are functioning normally. In other words, the monitored computer system(s) are functioning within normal ranges if sequential-analysis apparatus 224 generates an alert based on a detected statistical deviation as specified by the false-alarm probability (e.g., one in 1000 observations).

Similarly, the missed-alarm probability used in the SPRT may represent a threshold beyond which the alert frequency may indicate anomalous behavior in the monitored computer system(s). For example, if the missed-alarm probability is set to five in 1000 observations, an alert frequency at or above five in 1000 observations may indicate that the monitored computer system(s) are exhibiting anomalous (e.g., abnormal) behavior. Furthermore, alert frequencies between the false-alarm probability and missed-alarm probability may indicate false alarms or missed alarms; in such cases, telemetric signals 210 may continue to be monitored until the alert frequency is resolved to be either a series of false alarms or a series of missed alarms.

In one or more embodiments, a multivariate SPRT is implemented using distribution-generation apparatus 222 and sequential-analysis apparatus 224. The multivariate SPRT may assess the statistical deviation of a combination of telemetry variables obtained from telemetric signals 210 (e.g., load metric, CPU utilization, idle time, memory utilization, disk activity, transaction latency, temperature, voltage, fan speed, current, etc.) instead of a single telemetry variable. As a result, degradation that affects multiple telemetry variables may be detected much more quickly than conventional applications of the SPRT to individual telemetry variables.

In one or more embodiments, telemetry variables associated with computer system 200 are pre-processed to identify correlations between groups of telemetry variables. As with other parameters associated with the SPRT (e.g., false-alarm probability, missed-alarm probability, hypotheses, etc.), the correlations may be determined using historical telemetry data obtained from computer system 200 and/or other computer systems with similar or identical hardware configurations. To determine the correlations, correlation coefficients may be calculated between all possible pairs of telemetry variables associated with computer system 200. Distribution-generation apparatus 222 and sequential-analysis apparatus 224 may then be configured to perform a multivariate SPRT on telemetry variables with a correlation coefficient above a pre-specified threshold (e.g., 0.4). In other words, fault-monitoring module 220 may include functionality to perform a number of multivariate SPRTs for detecting statistical deviations in different groups of correlated telemetry variables from computer system 200.

To enable analysis of telemetric signals 210 using the multivariate SPRT, distribution-generation apparatus 222 may construct a multidimensional real-time distribution of two or more correlated telemetry variables. The multidimensional real-time distribution may continually be updated with new telemetry data as the telemetry data is received from computer system 200. For example, the multidimensional real-time distribution may be constructed from a "moving window" of 1000 observations of telemetric signals 210. Alternatively, the multidimensional real-time distribution may be generated from moving windows of archived telemetry data for offline analysis of telemetric signals 210.

To perform the multivariate SPRT, sequential-analysis apparatus 224 may compare the multidimensional real-time distribution with a multidimensional reference distribution of the same telemetry variables to analyze a statistical deviation of the multidimensional real-time distribution. Sequential-analysis apparatus 224 then may use the presence or absence of the statistical deviation to assess the integrity of computer system 200. Degradation in computer system 200 may be detected if the assessed integrity falls below a threshold (e.g., if the statistical deviation increases beyond the threshold).

In one or more embodiments, the multidimensional reference distribution may correspond to a multidimensional distribution of pointwise differences in values of observed telemetry variables between normally operating computer system 200 and known-good system 202. For example, the multidimensional reference distribution may be approximated from the pointwise differences of k simultaneously observed telemetry variables from normally operating computer system 200 and known-good system 202 as a multivariate normal distribution with a k-dimensional mean ($\mu_1, \ldots, \mu_k$) and a k×k covariance matrix.

Along the same lines, the multidimensional real-time distribution may be calculated from pointwise differences in values of real-time (e.g., new) telemetry variables between normally operating computer system 200 and known-good system 202. For example, the multidimensional real-time distribution may also be approximated as a multivariate normal distribution with a k-dimensional mean and k×k covariance matrix using the pointwise differences of the last 1000 observations of k telemetry variables obtained from both computer system 200 and known-good system 202. On the other hand, the multidimensional reference distribution and multidimensional real-time distribution may be constructed from other types of empirical distributions if the pointwise differences conform better to the other types of empirical distributions, such as discrete probability distributions.

Sequential-analysis apparatus 224 may analyze the statistical deviation of the multidimensional real-time distribution from the multidimensional reference distribution based on the differences between parameters (e.g., means, covariance matrices, etc.) of each distribution. For example, sequential-analysis apparatus 224 may apply one or more parameters from both distributions to a distance function that calculates the statistical deviation of the multidimensional real-time distribution as a "distance" from the multidimensional reference distribution. Because the statistical deviation is based on a combination of telemetry variables instead of a single telemetry variable, sequential-analysis apparatus 224 may detect degradation that causes shifts in multiple correlated telemetry variables more quickly than a sequential-analysis mechanism that assesses statistical deviations of individual telemetry variables using univariate SPRTs.

Sequential-analysis apparatus 224 may further assess the integrity of computer system 200 based on the statistical deviation. In particular, the integrity of computer system 200 may be inversely proportional to the statistical deviation. For example, if the statistical deviation is within a certain threshold, the integrity of computer system 200 is verified. However, a statistical deviation beyond the threshold may correspond to a fall in the integrity of computer system 200 below the threshold. Moreover, the fall in integrity below the threshold may represent a degradation risk to computer system 200.

If sequential-analysis apparatus 224 finds a statistical deviation indicative of a degradation risk in integrity in computer system 200, fault-monitoring module 220 may use fault-management apparatus 226 to determine a fault in computer system 200 corresponding to a source of the statistical deviation. The source of the statistical deviation may be determined through continued monitoring and analysis of computer system 200 and/or through the preprocessing of telemetry variables in computer system 200.

In one or more embodiments, fault-management apparatus 226 applies root-cause-analysis techniques such as a multivariate state estimation technique (MSET) to determine the source of the statistical deviation as detected by sequential-analysis apparatus 224. In particular, once sequential-analysis apparatus 224 detects a statistical deviation in telemetric signals 210 beyond a predetermined threshold, fault-management apparatus 226 may use MSET to generate estimates of telemetric signals 210 based on the current set of telemetric signals 210 (e.g., the subset of telemetric signals 210 associated with the statistical deviation). Fault-management apparatus 226 may then obtain residuals by subtracting the estimated telemetric signals from the measured telemetric signals 210. In other words, the residuals may represent the deviation of the monitored computer system(s) from normal operating configurations. Fault-management apparatus 226 may then analyze the residuals to determine the source(s) of the statistical deviation. For example, fault-management apparatus 226 may also employ a univariate and/or multivariate SPRT to detect anomalies in individual telemetric signals and resolve the sources of the anomalies using correlations between signals found during the training stage of MSET.

In one or more embodiments, the nonlinear nonparametric regression technique used in fault-management apparatus 226 may refer to any number of pattern recognition algorithms. For example, see [Gribok] "Use of Kernel Based Techniques for Sensor Validation in Nuclear Power Plants," by Andrei V. Gribok, J. Wesley 20 Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different pattern recognition approaches. Hence, the term "MSET" as used in this specification can refer to (among other things) any 25 techniques outlined in [Gribok], including Ordinary Least Squares (OLS), Support Vector Machines (SVM), Artificial Neural Networks (ANNs), MSET, or Regularized MSET (RMSET). For example, fault-management apparatus 226 may determine the source of the statistical deviation by examining the drift of each telemetry variable causing the statistical deviation and comparing the drifts to known patterns of degradation in computer system 200 (e.g., from preprocessing of telemetry variables).

Once the source of the statistical deviation is identified, fault-management apparatus 226 may correct the fault by facilitating the replacement of a degrading component causing the statistical deviation. For example, fault-management apparatus 226 may enable a technician to quickly replace the degrading component by informing the technician of the type and location of the degrading component within computer system 200. Alternatively, if the statistical deviation is caused by a fault in one or more sensors, fault-management apparatus 226 may generate replacement signals in lieu of the sensors' faulty signals to maintain normal operation in computing system 200. For example, if a faulty temperature sensor in computing system 200 is causing fans to continuously cycle between low and high speeds, fault-management apparatus 226 may generate a series of replacement temperature values to maintain normal fan speeds in computing system 200 prior to the replacement of the faulty temperature sensor. Fault-management apparatus 226 may also facilitate the replacement of faulty sensors during a scheduled outage of computer system 200 by identifying and locating the faulty sensors.

Consequently, fault-monitoring module 220 may allow for earlier detection of degradation in computer system 200 using a multivariate SPRT than conventional monitoring mechanisms that use a univariate SPRT. Early detection and identification of degradation may further allow preventive maintenance to be performed on computer system 200 prior to the occurrence of failures that reduce availability and increase maintenance costs in computer system 200.

Those skilled in the art will appreciate that the multivariate SPRT is not limited to the analysis of telemetry data from monitored computer systems. In other words, fault-monitoring module 220 may be used to detect the onset of degradation in a variety of monitored systems. For example, fault-monitoring module 220 may be configured to analyze statistical deviations in groups of telemetry variables from nuclear plants, avionics systems, machines, and/or other types of engineering systems.

Figure 3A:
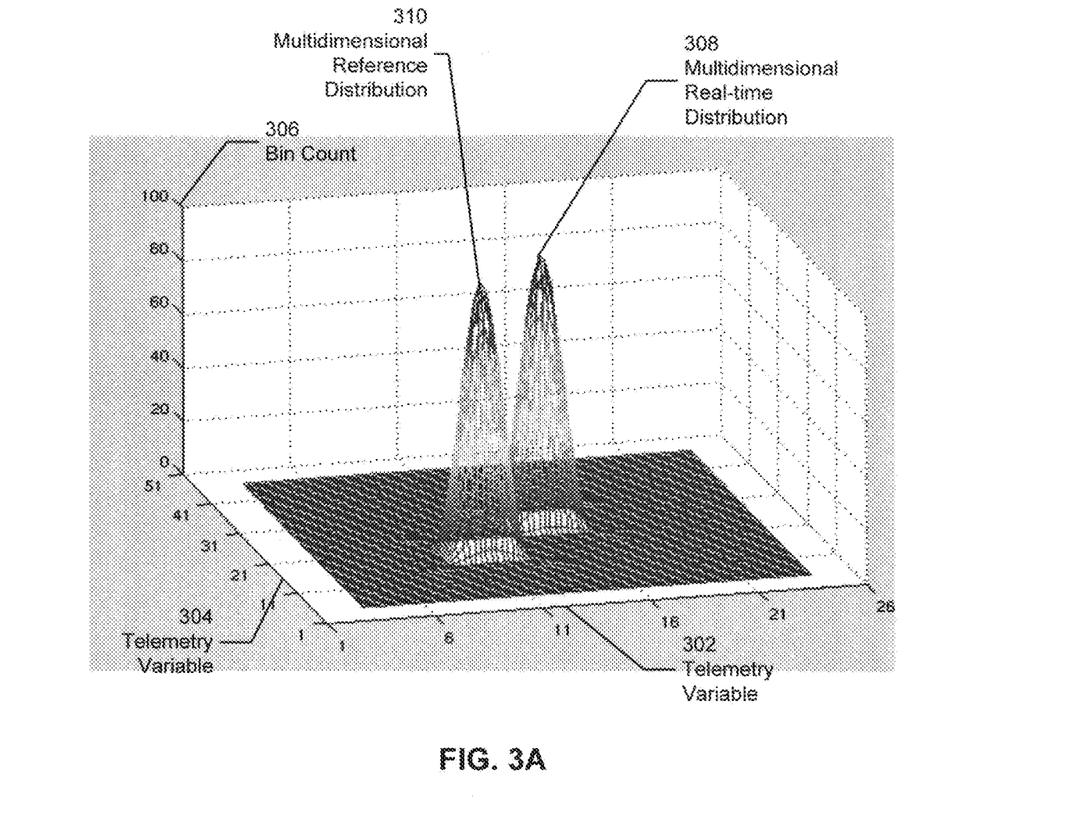
FIG. 3A shows an exemplary visualization of a multidimensional real-time distribution and a multidimensional reference distribution in accordance with an embodiment.

FIG. 3A shows an exemplary visualization of a multidimensional real-time distribution 308 and a multidimensional reference distribution 310 in accordance with an embodiment. More specifically, FIG. 3A shows a visualization of both distributions as functions of two telemetry variables 302-304. For example, multidimensional real-time distribution 308 and multidimensional reference distribution 310 may be generated from simulated values of telemetry variables 302-304 that are sampled from idealized normal distributions for telemetry variables 302-304.

Consequently, multidimensional real-time distribution 308 and multidimensional reference distribution 310 may represent multivariate normal distributions. Moreover, both distributions may correspond to distributions of pointwise differences between telemetry variables 302-304 sampled from different simulated systems. Multidimensional reference distribution 310 may represent the distribution of pointwise differences in telemetry variables 302-304 generated between a simulated normally operating monitored system and a simulated known-good system, while multidimensional real-time distribution 308 may represent the distribution of pointwise differences in telemetry variables 302-304 generated between a simulated real-time monitored system and the simulated known-good system.

Each distribution may be visualized by plotting a bin count 306 of telemetry variables 302-304 as a function of the values of telemetry variables 302-304. For example, multidimensional reference distribution 310 may be plotted as a function of pairs of values of telemetry variables 302-304 generated between the simulated normally operating monitored system and the simulated known-good system. Similarly, multidimensional real-time distribution 308 may be plotted as a function of pairs of values of telemetry variables 302-304 generated between the simulated real-time monitored system and the simulated known-good system. As a result, the highest bin count 306 values in multidimensional reference distribution 310 and multidimensional real-time distribution 308 may correspond to the means of the respective distributions. Similarly, the ranges in values of pairs of telemetry variables 302-304 observed in multidimensional reference distribution 310 and multidimensional real-time distribution 308 may be used to calculate covariance matrices of the respective distributions.

Furthermore, a multivariate SPRT may be used to calculate a statistical deviation of multidimensional real-time distribution 308 from multidimensional reference distribution 310. In particular, the multivariate SPRT may examine the statistical deviation of one or more parameters (e.g., mean, covariance matrix, bin count 306 values, etc.) of each distribution using a predefined distance function. In other words, the distance function may be defined as a drift in the values of multidimensional real-time distribution 308 from that of multidimensional reference distribution 310. If the drift increases beyond a threshold, degradation may be found in one or both telemetry variables 302-304. For example, a drift in the mean of multidimensional real-time distribution 308 from the mean of multidimensional reference distribution 310 may indicate degradation in the monitored system, while a drift in the covariance matrix of multidimensional reference distribution 310 may indicate noise in one or both telemetry variables 302-304 and/or a faulty sensor.

Because the multivariate SPRT analyzes a combination of telemetry variables 302-304, statistical deviations in both telemetry variables 302-304 may be found more quickly than with a univariate SPRT that analyzes each telemetry variable 302-304 individually. For example, a slight shift in the means of both telemetry variables 302-304 may be detected as a statistical deviation by the multivariate SPRT but not by the univariate SPRT.

Figure 3B:
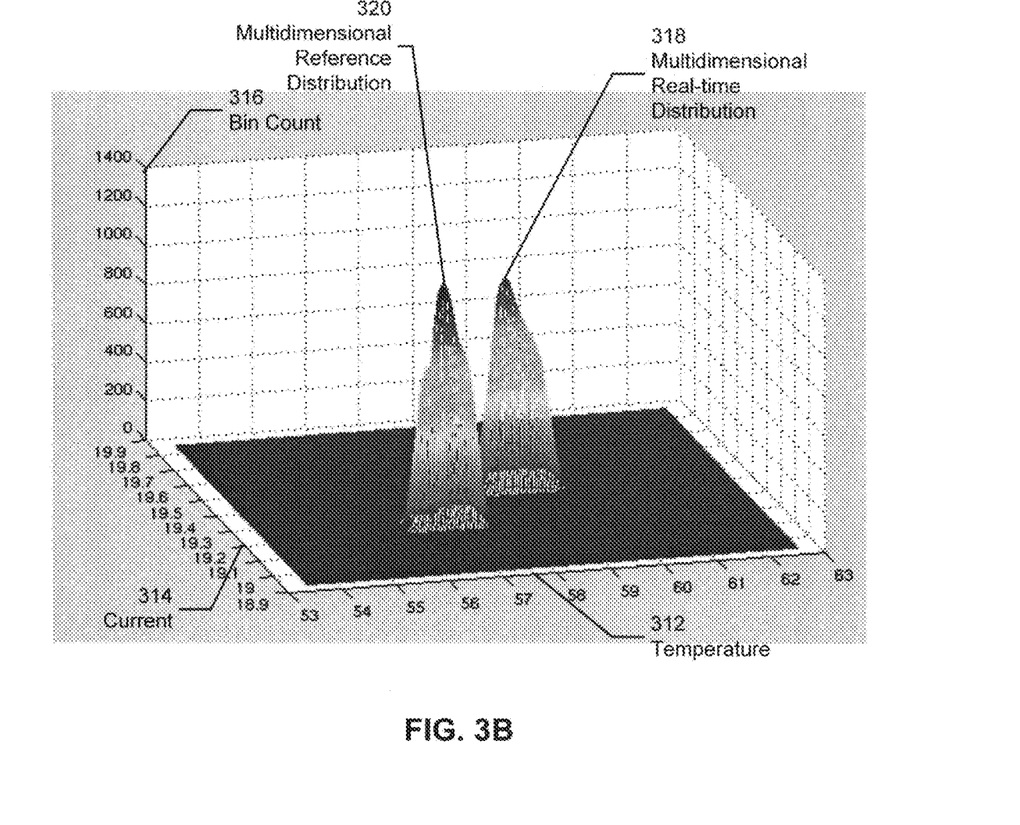
FIG. 3B shows an exemplary visualization of a multidimensional real-time distribution and a multidimensional reference distribution in accordance with an embodiment.

FIG. 3B shows an exemplary visualization of a multidimensional real-time distribution 318 and a multidimensional reference distribution 320 in accordance with an embodiment. More specifically, FIG. 3B shows a visualization of both distributions as functions of temperature 312 and current 314 values measured from computer servers (e.g., Batoka T5440 servers manufactured by Sun Microsystems, Inc.). For example, multidimensional real-time distribution 308 and multidimensional reference distribution 310 may correspond to two-dimensional distributions of temperature 312 and current 314 values that are observed from one or more known-good servers and/or one or more monitored servers.

Multidimensional reference distribution 320 may represent the distribution of pointwise differences in temperature 312 and current 314 observed between a normally operating computer server and a known-good computer server. Likewise, multidimensional real-time distribution 318 may represent the distribution of pointwise differences in temperature 312 and current 314 observed between a monitored computer server and the known-good computer server.

As with FIG. 3A, pairs of values for temperature 312 and current 314 are plotted using a bin count 316. Bin count 316 may correspond to the number of times a pair of values for temperature 312 and current 314 within a certain range is observed in each distribution. The highest bin count 316 value in each distribution may correspond to the most frequently observed values for temperature 312 and current 314 in the distribution, while the shape of the distribution may be represented by the collection of bin count 316 values in the distribution plotted as a function of temperature 312 and current 314. Moreover, multidimensional real-time distribution 318 and multidimensional reference distribution 320 may be distributed less evenly and/or smoothly than multidimensional real-time distribution 308 and multidimensional reference distribution 310 in FIG. 3A because data used to generate the distributions in FIG. 3B corresponds to values of temperature 312 and current 314 measured by sensors in computer servers instead of simulated data sampled from idealized normal distributions.

The multivariate SPRT may also be used to detect a statistical deviation of multidimensional real-time distribution 318 from multidimensional reference distribution 320. For example, statistical parameters such as means, modes, and/or covariance matrices may be calculated from each distribution and used in a distance function to detect a drift in the values of multidimensional real-time distribution 318 from that of multidimensional reference distribution 320. If the drift increases beyond a threshold, degradation may be found in temperature 312 and/or current 314 values in the monitored computer server. Furthermore, a drift in either temperature 312 or current 314 may be detected as quickly as with a univariate SPRT, while a drift in both temperature 312 and current 314 may be detected more quickly than with a univariate SPRT.

Figure 4:
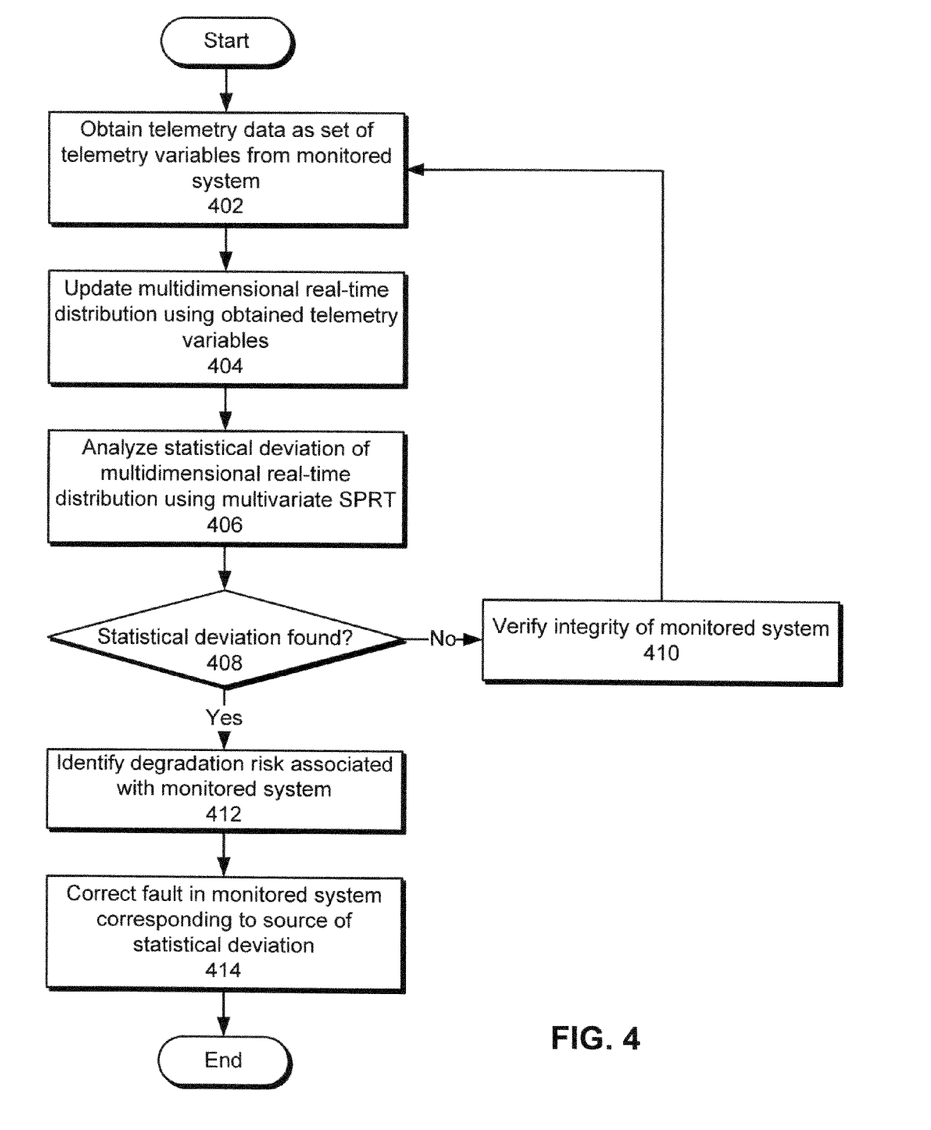
FIG. 4 shows a flowchart illustrating the process of analyzing telemetry data from a monitored system in accordance with an embodiment.

FIG. 4 shows a flowchart illustrating the process of analyzing telemetry data from a monitored system in accordance with an embodiment. In one or more embodiments, one or more of the steps may be omitted, repeated, and/or performed in a different order. Accordingly, the specific arrangement of steps shown in FIG. 4 should not be construed as limiting the scope of the technique.

First, the telemetry data is obtained as a set of telemetry variables from the monitored system (operation 402). For example, the telemetry data may include sensor measurements of load metric, CPU utilization, idle time, memory utilization, disk activity, transaction latency, temperature, voltage, fan speed, current, and/or other telemetry variables from a monitored computer system. On the other hand, the telemetry data may correspond to telemetry variables measured from an engineering system such as a nuclear plant, an avionics system, and/or a machine. Next, a multidimensional real-time distribution of the telemetry data is updated using the obtained telemetry variables (operation 404). For example, the multidimensional real-time distribution may be constructed from a moving window of a user-configurable number of observations of the telemetry variables. Furthermore, the multidimensional real-time distribution may correspond to a distribution of pointwise differences in the obtained telemetry variables from the monitored system and the same telemetry variables observed from a known-good system.

A statistical deviation of the multidimensional real-time distribution is then analyzed using a multivariate SPRT (operation 406). In particular, the statistical deviation may be obtained as the drift of the multidimensional real-time distribution from a multidimensional reference distribution for the monitored system. For example, the statistical deviation may be calculated as a difference between the means, covariance matrices, and/or other parameters of the distributions.

Next, the integrity of the monitored system is assessed based on the presence or absence of the statistical deviation (operation 408). The integrity of the monitored system may be inversely proportional to the statistical deviation found in operation 406. If no statistical deviation is found, the integrity of the monitored system is verified (operation 410), and the monitored system is continually analyzed by periodically obtaining telemetry data from the monitored system (operation 402) and applying a multivariate SPRT to the monitored system (operations 404-406) to detect a statistical deviation in the telemetry data (operation 408).

However, if a statistical deviation is found, a degradation risk associated with the monitored system may be identified (operation 412). The degradation risk may represent the onset of degradation in one or more telemetry variables analyzed using the multivariate SPRT. The degradation risk may also be mitigated by correcting a fault in the monitored system corresponding to a source of the statistical deviation (operation 414). The fault may be identified using a nonlinear, nonparametric regression technique such as MSET. The fault may then be corrected by replacing a degrading component causing the statistical deviation, generating a replacement signal to maintain normal operation in the monitored system (e.g., if a faulty sensor is responsible for the statistical deviation), and/or replacing the faulty sensor.

Figure 5:
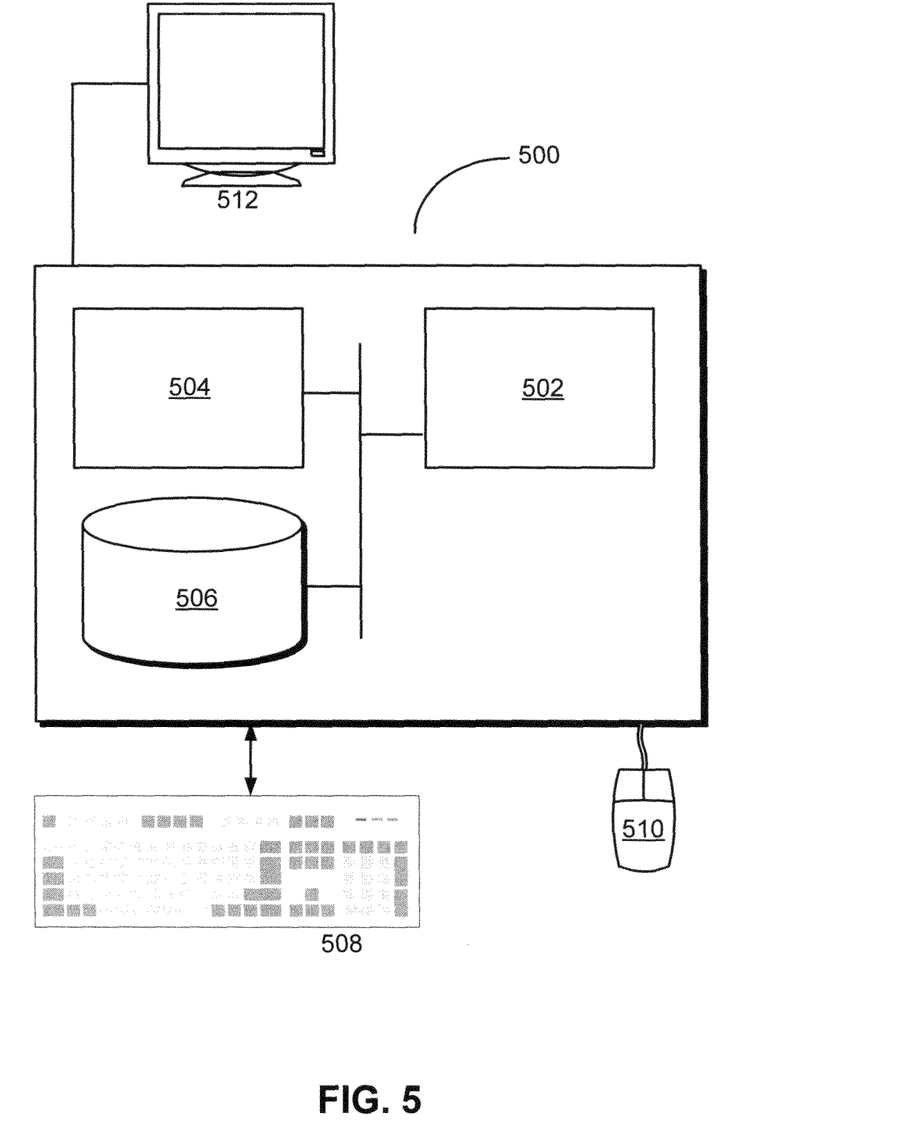
FIG. 5 shows a computer system.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In particular, computer system 500 may implement a fault-monitoring module that analyzes telemetry data from a monitored system. The fault-monitoring module may include a distribution-generation apparatus that generates a multidimensional real-time distribution of the telemetry data. The fault-monitoring module may also include a sequential-analysis apparatus that analyzes a statistical deviation of the multidimensional real-time distribution from a multidimensional reference distribution for the monitored system using a multivariate SPRT. The sequential-analysis apparatus may also assess the integrity of the monitored system based on the statistical deviation. Finally, the fault-monitoring module may include a fault-management apparatus that determines a fault in the monitored system corresponding to a source of the statistical deviation if the assessed integrity falls below a threshold.

In addition, one or more components of computer system 500 may be remotely located and connected to the other components over a network. Portions of the present embodiments (e.g., monitoring mechanism, fault-monitoring module, distribution-generation apparatus, sequential-analysis apparatus, fault-management apparatus, etc.) may also be located on different nodes of a distributed system that implements the embodiments. For example, the present embodiments may be implemented using a cloud computing system that provides a remote monitoring and analysis framework for a set of computer servers, avionics systems, nuclear power plants, and/or machines.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for analyzing telemetry data from a monitored system, comprising, in at least one computer, performing one or more operations for:
   periodically obtaining the telemetry data as a set of telemetry variables from the monitored system;
   using the obtained telemetry variables to update a multidimensional real-time distribution of the telemetry data that represents a multidimensional distribution of pointwise differences in values of the telemetry variables observed at the monitored system and values of the telemetry variables observed at a known-good system,
   wherein a first dimension for the multidimensional real-time distribution corresponds to a first type of the telemetry variables, and wherein a second dimension for the multidimensional real-time distribution corresponds to a second type of the telemetry variables that is different from the first type;
   using a multivariate sequential probability ratio test (SPRT) to analyze a statistical deviation of a parameter of the multidimensional real-time distribution from a parameter of a multidimensional reference distribution for the monitored system that represents a multidimensional distribution of pointwise differences in values of the telemetry variables observed at a normally operating system and values of the telemetry variables observed at the known-good system, and
   wherein using the SPRT comprises determining a drift in values of a matrix for the parameter of the multidimensional real-time distribution from values of a matrix for the parameter of the multidimensional real-time distribution;
   assessing the integrity of the monitored system based on the drift, wherein assessing the integrity comprises, when the drift falls below a threshold,
   determining a fault in the monitored system corresponding to a source of the statistical deviation;
   determining a degrading field replaceable unit (FRU) of the monitored system that caused the statistical deviation by using at least some data in the multidimensional real-time distribution; and replacing the degrading FRU.

2. The computer-implemented method of claim 1, wherein assessing the integrity of the monitored system involves:
   verifying the integrity of the monitored system if the statistical deviation is not found; and
   identifying a degradation risk associated with the monitored system if the statistical deviation is found.

3. The computer-implemented method of claim 1, wherein determining the fault in the monitored system involves:
   generating a replacement signal to maintain normal operation in the monitored system.

4. The computer-implemented method of claim 1, wherein the multidimensional reference distribution is created from historical telemetry data associated with the monitored system.

5. The computer-implemented method of claim 1, wherein the monitored system corresponds to a computer system.

6. The computer-implemented method of claim 5, wherein the telemetry variables for the computer system comprise at least one of:
a load metric;
a CPU utilization;
an idle time;
a memory utilization;
a disk activity;
a transaction latency;
a temperature;
a voltage;
a fan speed; and
a current.

7. The computer-implemented method of claim 1, wherein the statistical deviation is analyzed based on a false-alarm probability and a missed-alarm probability for the monitored system.

8. The method of claim 1, further comprising receiving correlations between telemetry variables that were identified during a pre-processing operation by computing correlation coefficients for sets of two or more telemetry variables,
wherein the telemetry data is obtained for telemetry variables with a correlation coefficient above a predetermined threshold.

9. The method of claim 1, wherein the first dimension corresponds to data in the telemetry data that is collected using a first type of sensor, wherein the second dimension corresponds to data in the telemetry data that is collected using a second type of sensor that is different from the first type of sensor, and wherein a third dimension for the multidimensional real-time distribution corresponds to a bin count for the telemetry data.

10. The method of claim 1, wherein the matrix for the parameter of the multidimensional real-time distribution is a means matrix for the multidimensional real-time distribution and the matrix for the parameter of the multidimensional reference distribution is a means matrix for the multidimensional reference distribution.

11. The method of claim 1, wherein the matrix for the parameter of the multidimensional real-time distribution is a covariance matrix for the multidimensional real-time distribution and the matrix for the parameter of the multidimensional reference distribution is a covariance matrix for the multidimensional reference distribution.

12. A system for analyzing telemetry data from a monitored system, comprising:
a monitoring mechanism configured to periodically obtain the telemetry data as a set of telemetry variables from the monitored system;
a distribution-generation apparatus configured to use the obtained telemetry variables to update a multidimensional real-time distribution of the telemetry data that represents a multidimensional distribution of pointwise differences in values of the telemetry variables observed at the monitored system and values of the telemetry variables observed at a known-good system, wherein a first dimension for the multidimensional real-time distribution corresponds to a first type of the telemetry variables, and wherein a second dimension for the multidimensional real-time distribution corresponds to a second type of the telemetry variables that is different from the first type;
a sequential-analysis apparatus configured to:
use a multivariate sequential probability ratio test (SPRT) to analyze a statistical deviation of the multidimensional real-time distribution from a multidimensional reference distribution for the monitored system that represents a multidimensional distribution of pointwise differences in values of the telemetry variables observed at a normally operating system and values of the telemetry variables observed at the known-good system, and wherein using the SPRT comprises determining a drift in values of a matrix for the parameter of the multidimensional real-time distribution from values of a matrix for the parameter of the multidimensional real-time distribution; and
assess the integrity of the monitored system based on the statistical drift; and
a fault-management apparatus configured to determine a fault in the monitored system corresponding to a source of the statistical deviation when the drift falls below a threshold, wherein the fault-management apparatus is further configured to:
determine a degrading field replaceable unit (FRU) of the monitored system that caused the statistical deviation by using at least some data in the multidimensional real-time distribution; and replacing the degrading FRU.

13. The system of claim 12, wherein assessing the integrity of the monitored system involves:
verifying the integrity of the monitored system if the statistical deviation is not found; and
identifying a degradation risk associated with the monitored system if the statistical deviation is found.

14. The system of claim 12, wherein determining the fault in the monitored system involves:
generating a replacement signal to maintain normal operation in the monitored system.

15. The system of claim 12, wherein the multidimensional reference distribution is created from historical telemetry data associated with the monitored system.

16. A non-transitory computer-readable storage medium storing instructions that when executed by a computer cause the computer to perform a method for analyzing telemetry data from a monitored system, the method comprising:
periodically obtaining the telemetry data as a set of telemetry variables from the monitored system;
using the obtained telemetry variables to update a multidimensional real-time distribution of the telemetry data that represents a multidimensional distribution of pointwise differences in values of the telemetry variables observed at the monitored system and values of the telemetry variables observed at a known-good system, wherein a first dimension for the multidimensional real-time distribution corresponds to a first type of the telemetry variables, and wherein a second dimension for the multidimensional real-time distribution corresponds to a second type of the telemetry variables that is different from the first type;
using a multivariate sequential probability ratio test (SPRT) to analyze a statistical deviation of a parameter of the multidimensional real-time distribution from a parameter of a multidimensional reference distribution for the monitored system that represents a multidimensional distribution of pointwise differences in values of the telemetry variables observed at a normally operating system and values of the telemetry variables observed at the known-good system, and
wherein using the SPRT comprises determining a drift in values of a matrix for the parameter of the multidimensional real-time distribution from values of a matrix for the parameter of the multidimensional real-time distribution;
assessing the integrity of the monitored system based on the drift, wherein assessing the integrity comprises, when the drift determining a fault in the monitored system corresponding to a source of the statistical deviation;

determining a degrading field replaceable unit (FRU) of the monitored system that caused the statistical deviation by using at least some data in the multidimensional real-time distribution; and replacing the degrading FRU.

17. The computer-readable storage medium of claim 16, wherein assessing the integrity of the monitored system involves:

verifying the integrity of the monitored system if the statistical deviation is not found; and identifying a degradation risk associated with the monitored system if the statistical deviation is found.

18. The computer-readable storage medium of claim 16, wherein determining the fault in the monitored system involves:

generating a replacement signal to maintain normal operation in the monitored system.

19. The computer-readable storage medium of claim 16, wherein the multidimensional reference distribution is created from historical telemetry data associated with the monitored system.

* * * * *